US009567092B2

(12) United States Patent
Lopez Fernandez et al.

(10) Patent No.: US 9,567,092 B2
(45) Date of Patent: Feb. 14, 2017

(54) FLEXIBLE AND FIREPROOF APU DRAINAGE DEVICE

(75) Inventors: David Lopez Fernandez, Getafe-Madrid (ES); Maria Aranzazu Garcia Patino, Getafe-Madrid (ES); Beatriz Quesada de Francisco, Getafe-Madrid (ES)

(73) Assignee: Airbus Operations S.L., Getafe-Madrid (ES)

( * ) Notice: Subject to any disclaimer, the term of this patent is extended or adjusted under 35 U.S.C. 154(b) by 269 days.

(21) Appl. No.: 13/981,986

(22) PCT Filed: Jan. 27, 2012

(86) PCT No.: PCT/ES2012/070043
§ 371 (c)(1),
(2), (4) Date: Dec. 9, 2013

(87) PCT Pub. No.: WO2012/101313
PCT Pub. Date: Aug. 2, 2012

(65) Prior Publication Data
US 2014/0084107 A1    Mar. 27, 2014

(30) Foreign Application Priority Data
Jan. 27, 2011    (ES) .................................. 201130095

(51) Int. Cl.
*B64D 33/00*    (2006.01)
*B64C 1/14*    (2006.01)
*B64D 41/00*    (2006.01)

(52) U.S. Cl.
CPC ............. *B64D 33/00* (2013.01); *B64C 1/1453* (2013.01); *B64D 41/00* (2013.01); *B64D 2041/002* (2013.01)

(58) Field of Classification Search
CPC ... B64D 33/00; B64D 41/00; B64D 2041/002; B64C 1/1453
See application file for complete search history.

(56) References Cited

U.S. PATENT DOCUMENTS

| 6,006,373 | A  | * | 12/1999 | Hoang   | .............................. 4/431 |
| 6,854,769 | B2 |   | 2/2005  | Lutzer  |                                       |
| 2002/0056789 | A1 | * | 5/2002 | Jones   | ......................... 244/129.1 |
| 2006/0032974 | A1 |   | 2/2006 | Williams |                                     |

FOREIGN PATENT DOCUMENTS

| FR | 2705428    | 11/1994 |
| JP | 2002227264 | 8/2002  |
| WO | 0236426    | 5/2002  |

OTHER PUBLICATIONS

International Search Report, Jul. 18, 2012.

* cited by examiner

*Primary Examiner* — Valentina Xavier
(74) *Attorney, Agent, or Firm* — Greer, Burns & Crain, Ltd.

(57) ABSTRACT

An aircraft auxiliary power unit (APU) flexible and fireproof drainage device including a bellows which receives leakage fluids from an APU engine; a drain pipe which transfers leakage fluids outside the aircraft from the bellows, and a support piece surrounding the drain pipe. The bellows connects the APU engine with the drain pipe. The support piece provides stability to the bellows and the drain pipe.

14 Claims, 4 Drawing Sheets

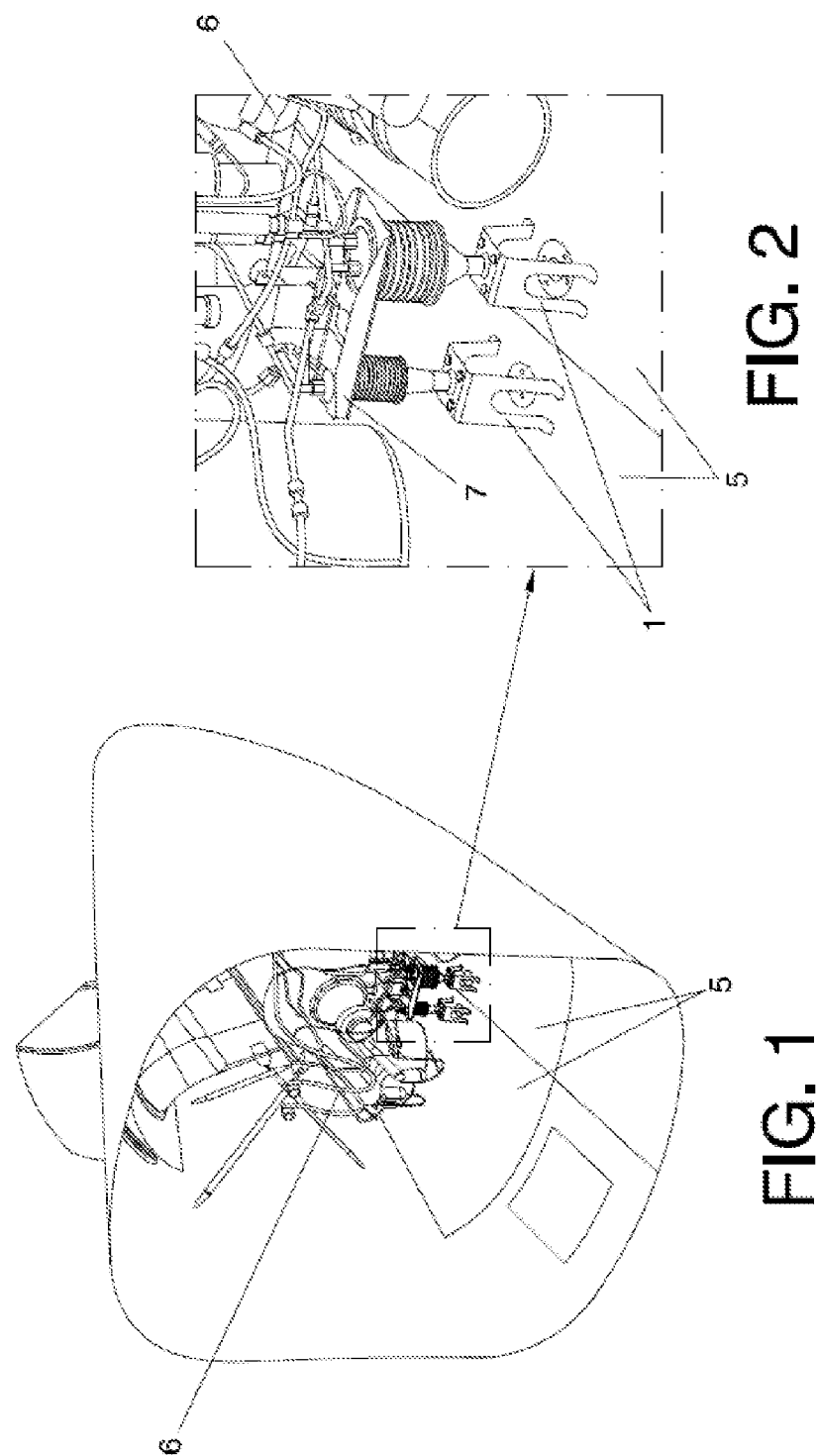

FLEXIBLE AND FIREPROOF APU DRAINAGE DEVICE

CROSS-REFERENCES TO RELATED APPLICATIONS

This application claims the benefit of the Spanish patent application No. P201130095 filed on Jan. 27, 2011, the entire disclosures of which are incorporated herein by way of reference.

BACKGROUND OF THE INVENTION

This invention relates to a device to drain leakage liquids from an aircraft auxiliary power unit ("APU"), maintaining fireproof conditions at APU compartment. It is included in the technical field of auxiliary power units for aerospace industry.

Most modern aircraft include an APU as standard operational equipment. Typically, the APU is positioned in a compartment located at the aircraft tail cone portion.

APU compartments must fulfill fireproof requirements. In case of a fire in the APU compartment, its structure must be capable of resisting damages produced by flames. Moreover, no flame can enter any part of the APU due to explosion danger.

Access to the APU compartment is provided through maintenance doors. These doors must fulfill the fireproof requirements of the APU compartment, but they must also provide the draining necessities. So the problem solved by this invention is how to guarantee fireproof conditions at the APU compartment, maintaining drainage capability of leakage fluids.

The state of the art presents some references about how to deal with leakage fluids and how to keep fireproof conditions in APU compartments as well. However, no evidences about how to solve these two problems together have been found.

Document U.S. Pat. No. 3,556,444 A discloses an apparatus for controlling the discharge of leakage fluids from the jet engines of an aircraft, wherein removed fluids are directed into the exhaust jet of the engines for combustion.

Document EP 1 062 155 B1 shows an apparatus for draining fluid from an aircraft auxiliary power unit, wherein the fluids are drained by gravity through a check valve.

Document EP 2 147 862 A2 reveals an auxiliary power unit inlet door actuation mechanism to be used at fireproof enclosures.

SUMMARY OF THE INVENTION

In order to achieve the objectives and to solve the aforementioned drawbacks, the invention has developed an aircraft APU flexible and fireproof drainage device, comprising at least a bellows which receives leakage fluids from the APU engine; a drain pipe which transfers leakage fluids outside the aircraft from the bellows; and a support piece surrounding the drain pipe. Other features are: the bellows, the drain pipe and the support piece are assembled together; the bellows connects the APU engine with the drain pipe; the drain pipe and the support piece connect the bellows with the APU maintenance door; and the support piece is placed on the inner side of the APU maintenance door, providing sustainability to the bellows and the drain pipe.

The bellows comprises a bellows top, a bellows bottom, at least a group of bellows bumps and bellows indentations, wherein the bellows is a single piece, manufactured as a single undivided whole.

The drain pipe comprises a drain pipe top, a drain pipe bottom, a drain pipe duct, a drain pipe funnel, connecting the drain pipe top with the drain pipe duct, and a drain pipe support, having threads. The drain pipe is a single piece, manufactured as a single undivided whole.

The support piece comprises at least three support legs, and a support plate having threads. The drain pipe is placed on the support piece, wherein the drain pipe support is located over the support plate, having screws which join the drain pipe support with the support plate using their threads.

In order to facilitate a better understanding of this specification, and being an integral part thereof, a series of figures in which the object of the invention has been represented with an illustrative and not limitative manner is attached.

BRIEF DESCRIPTION OF THE DRAWINGS

The invention will be better understood from reading the following detailed description taken in conjunction with the drawings in which similar reference numbers are used to designate similar elements, and in which:

FIG. 1 is a general view of an APU compartment.

FIG. 2 is a detail of FIG. 1, showing the drainage device allocated at the APU compartment.

Figure 3:
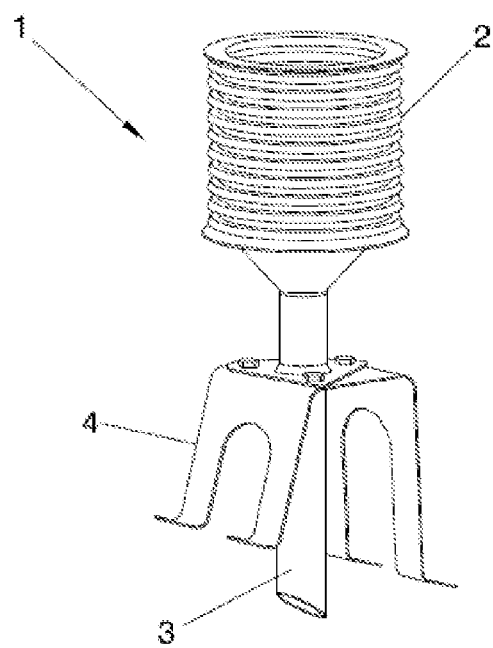
FIG. 3 shows a general view of the flexible and fireproof drainage device.

A list of reference numbers used on the drawings is given hereinafter: 1=flexible and fireproof drainage device; 2=bellows; 3=drain pipe; 4=support piece; 5=APU maintenance doors; 6=APU engine; 7=leakage tray; 20=bellows top; 21=bellows bumps; 22=bellows indentations; 23=bellows bottom; 30=drain pipe top; 31=drain pipe funnel; 32=drain pipe duct; 33=drain pipe support; 34=drain pipe thread; 35=drain pipe bottom; 41=support leg; 42=support plate; 43=screws; 44=support thread.

DETAILED DESCRIPTION OF THE PREFERRED EMBODIMENTS

A description of the invention based on the aforementioned figures is made hereinafter. An APU has two drainage devices (1), one for draining water and the other one for draining oil (FIGS. 1, 2). The drainage devices (1) are used to remove these liquids out of the aircraft. Each drainage device (1) is mounted over the APU maintenance door (5). As the APU starts to work, the drainage devices (1) must extract those leakage liquids from the aircraft, and the pipes assemblage must also be sealed to achieve fireproof requirements.

The aim of the invention is to provide a drainage device capable of withstanding the fireproof requirement and absorbing assembly misalignments due to the movement of the drainage system when the APU maintenance doors (5) are opened. The design of this device (1) is possible due to an intermediate elastic piece, a bellows (2), which connects the outside drainage pipe, plus a support, with the APU contact area equipped for drainage.

The design allows the drainage device (1) to absorb all possible displacements due to assembly misalignments, vibrations or any other undesirable effects while the APU is working without losing the APU compartment fireproof sealing requirements.

Figure 4:
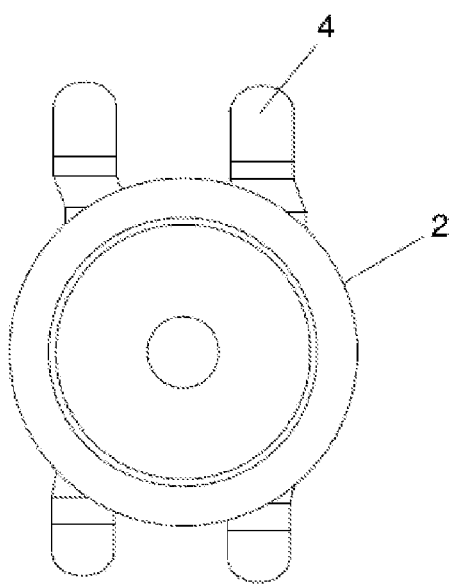
FIG. 4 is a top view of the drainage device.
Figure 5:
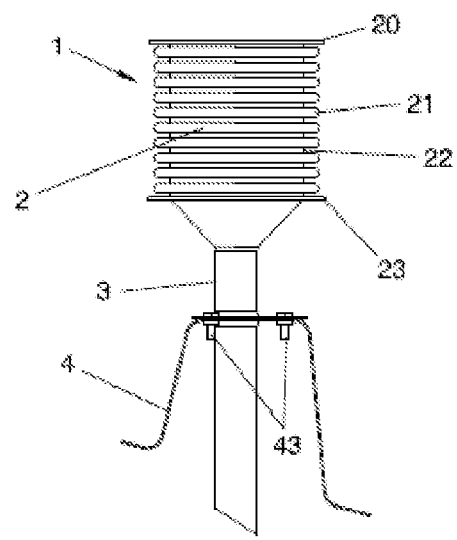
FIG. 5 is a side view of the drainage device.
Figure 6:
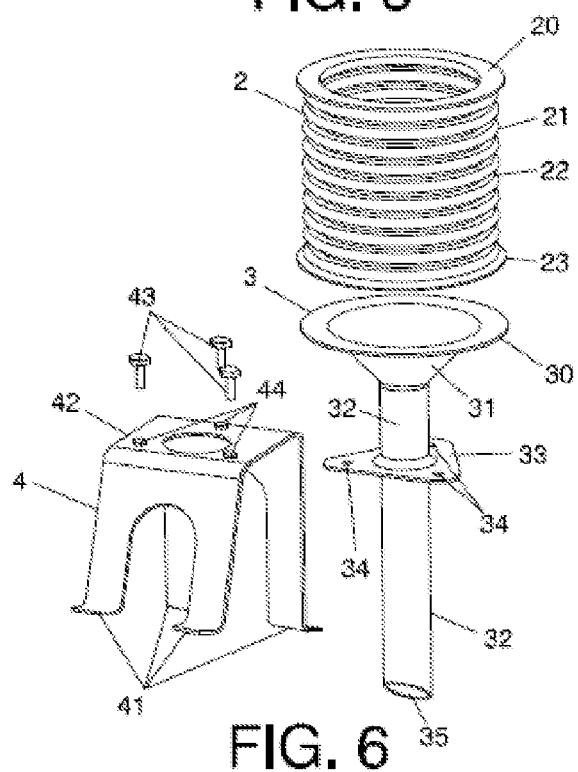
FIG. 6 is an exploded view of the drainage device.

FIG. 3 allows a better understanding of the aim of the invention. The flexible and fireproof drainage device (1) has a bellows (2) which receives through its internal side leakage fluids from the APU engine (6). The drainage device (1) also has a drain pipe (3) which transfers leakage fluids outside the aircraft from the bellows (2), and a support piece (4) surrounding the drain pipe (3). The bellows (2), the drain pipe (3) and the support piece (4) are assembled together. The bellow (2) connects the APU engine (6) with the drain pipe (3), and the support piece (4) provides stability to the bellows (2) and the drain pipe (3). The drain pipe (3) and the support piece (4) connect the bellows (2) with the APU maintenance doors (5). Further assembly details can also be shown: FIG. 4 shows a top view of FIG. 3, and FIG. 5 is a side view of the drainage device (1). FIG. 6 shows an exploded view of the drainage device (1) with its more relevant elements.

Figure 7:
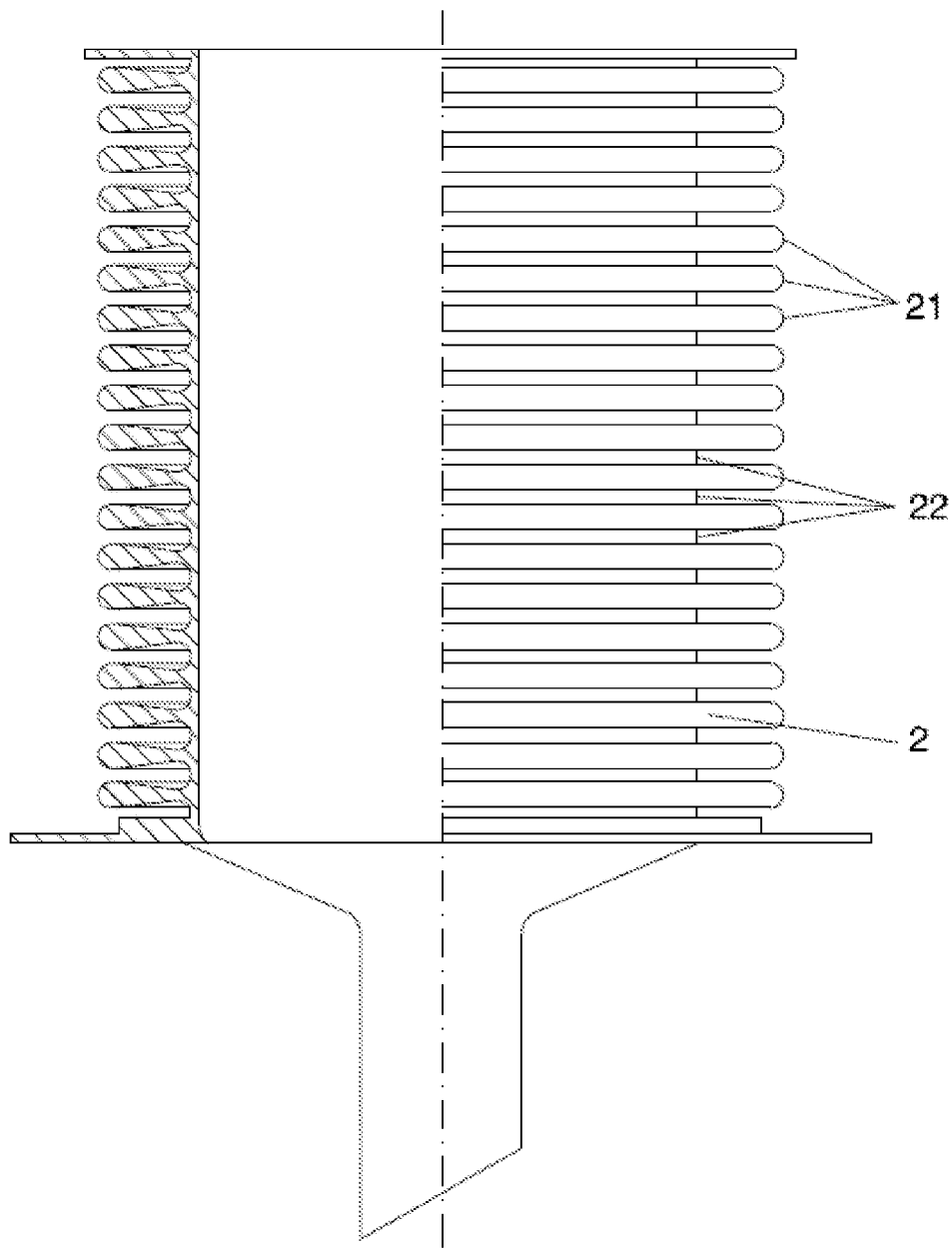
FIG. 7 is a cross section of the bellows.

Although each bellows (2) is a single piece, manufactured as a single undivided whole, several parts can be distinguished. As it can be seen in FIG. 6, the bellows (2) has a top plate (20) and a bottom plate (23). There is at least a group of bellows bumps (21) and bellows indentations (22); the number of bumps (21) and indentations (22) is variable, depending on the bellows (2) length required to achieve the drainage requirements. The top plate (20) is held by the leakage tray (7), allowing the proper placement of the bellows (2). The bellows (2) is joined to the drain pipe (3) by welding. FIG. 7 is a cross section of the bellows; according to this figure, the ring which composes the bellows (2) has a solid inside section.

The drain pipe (3) is a single piece as well, manufactured as a single undivided whole. The drain pipe (3) comprises a drain pipe top (30) and a drain pipe duct (32), with a drain pipe funnel (31), connecting the drain pipe top (30) with the drain pipe duct (32). There is also a drain pipe support (33) having threads (34), and a drain pipe bottom (35). The drain pipe support (33) provides stability to the drain pipe (3), as it helps to sustain the support piece (4) as will be explained later on.

The support piece (4) comprises at least three support legs (41) and a support plate (42) having threads (44). The support legs (41) are placed over the internal side of the APU maintenance door (5). The support legs (41) are attached to the APU maintenance doors (5) using rivets. The support plate (42) is used to place the drain pipe support (33) on it, having screws (43) which join the drain pipe support (33) with the support plate (42) using their threads (34, 44).

As it has been mentioned before, each drainage device (1) is mounted on the APU maintenance door (5), being the drain pipe bottom (35) set into the door (5). A fireproof seal (not shown) around the drain pipe bottom (35) guarantees fireproof conditions in the APU compartment. The drainage device (1) will remain as an operative mechanism whenever the APU maintenance doors (5) are kept closed. When the APU maintenance doors (5) are open, while the aircraft is on-ground operation, the drainage is spilled directly onto the floor.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft auxiliary power unit (APU) flexible and fireproof drainage device, comprising:
   a bellows arranged to receive leakage fluids from an APU engine,
   a drain pipe arranged to transfer the received leakage fluids outside the aircraft from the bellows, and
   a support piece formed separately from and spaced from the bellows and surrounding the drain pipe.

2. An aircraft APU flexible and fireproof drainage device according to claim 1, wherein the bellows, the drain pipe and the support piece are assembled together, and wherein the bellows connects the APU engine with the drain pipe, the drain pipe and the support piece connect the bellows with an APU maintenance door of the aircraft, and, the support piece has a portion configured to be placed onto the maintenance door internal side, providing sustainability to the bellows and the drain pipe.

3. An aircraft APU flexible and fireproof drainage device according to claim 1, wherein the bellows comprises:
   a bellows top;
   a bellows bottom; and
   at least a group of bellows bumps and bellows indentations.

4. An aircraft APU flexible and fireproof drainage device according to claim 3, wherein the bellows is a single piece, manufactured as a single undivided whole.

5. An aircraft APU flexible and fireproof drainage device according to claim 1, wherein the drain pipe comprises:
   a drain pipe top;
   a drain pipe bottom;
   a drain pipe duct;
   a drain pipe funnel connecting the drain pipe top with the drain pipe duct; and
   a drain pipe support, having threads.

6. An aircraft APU flexible and fireproof drainage device according to claim 5, wherein the drain pipe is a single piece, manufactured as a single undivided whole.

7. An aircraft APU flexible and fireproof drainage device according to claim 5, wherein the support piece comprises at least three support legs and a support plate having threads.

8. An aircraft APU flexible and fireproof drainage device according to claim 7, wherein the drain pipe is placed onto the support piece, wherein the drain pipe support is located over the support plate, and including screws which join the drain pipe support with the support plate using their threads.

9. An aircraft comprising an APU flexible and fireproof drainage device according to claim 1.

10. An aircraft auxiliary power unit (APU) flexible and fireproof drainage device, comprising:
    a bellows arranged to receive leakage fluids from an APU engine,
    a drain pipe arranged to transfer the received leakage fluids outside the aircraft from the bellows, and
    a support piece formed separately from and spaced from the bellows and surrounding the drain pipe, the support piece comprising a head and at least one leg, wherein the drain pipe passes through the head of the support piece.

11. The aircraft APU flexible and fireproof drainage device of claim 10, wherein the at least one leg of the support piece is attached to a maintenance door.

12. The aircraft APU flexible and fireproof drainage device of claim 10, wherein the support piece comprises at least three legs.

13. The aircraft APU flexible and fireproof drainage device of claim 12, wherein the drain pipe is secured to the support piece with one or more screws.

14. An aircraft auxiliary power unit (APU) flexible and fireproof drainage device, comprising:
- a bellows arranged to receive leakage fluids from an APU engine,
- a drain pipe arranged to transfer the received leakage fluids outside the aircraft from the bellows, and
- a support piece formed separately from and spaced from the bellows and surrounding the drain pipe, the support piece comprising at least one leg and a support plate having threads.

* * * * *